United States Patent [19]

Freidzon

[11] Patent Number: 5,629,370
[45] Date of Patent: May 13, 1997

[54] HIGH SOLIDS VINYL ACETATE-ETHYLENE EMULSIONS

[75] Inventor: Yakov S. Freidzon, Durham, N.C.

[73] Assignee: Reichhold Chemicals, Inc., Durham, N.C.

[21] Appl. No.: 638,782

[22] Filed: Apr. 29, 1996

[51] Int. Cl.$^6$ .................................................. C08F 2/16
[52] U.S. Cl. ........................ 524/503; 524/375; 524/459; 526/202
[58] Field of Search .................... 524/375, 459, 524/503; 526/202

[56] References Cited

U.S. PATENT DOCUMENTS

| | | | |
|---|---|---|---|
| 4,267,090 | 5/1981 | Heimberg et al. | 260/29.6 R |
| 4,921,898 | 5/1990 | Lenney et al. | 524/459 |
| 5,070,134 | 12/1991 | Oyamada et al. | 524/503 |

FOREIGN PATENT DOCUMENTS

| | | |
|---|---|---|
| 17-22692 | 6/1942 | Japan . |
| 38-223053 | 9/1963 | Japan . |
| 43-17583 | 7/1968 | Japan . |
| 60-1272 | 1/1985 | Japan . |

*Primary Examiner*—Kriellion S. Morgan
*Attorney, Agent, or Firm*—Bell, Seltzer, Park & Gibson

[57] ABSTRACT

A vinyl acetate-ethylene copolymer emulsion having a solids content of at least 65 percent by weight is disclosed. Specifically, the copolymer emulsion comprises about 5 to 40 percent by weight ethylene, about 60 to 95 percent by weight vinyl acetate, about 0.8 to 2.0 percent by weight of a fully or partially hydrolyzed polyvinyl alcohol, and a mixture of nonionic ethoxylated alkyl phenol surfactants having a HLB of from about 16.0 to 16.5.

8 Claims, No Drawings

HIGH SOLIDS VINYL ACETATE-ETHYLENE EMULSIONS

FIELD OF THE INVENTION

The present invention relates to vinyl acetate-ethylene emulsions. More particularly, the invention relates to vinyl acetate-ethylene emulsions having a low viscosity at high solids content.

BACKGROUND OF THE INVENTION

Water-borne adhesives have experienced increased use relative to other materials such as solvent-borne and hot melt adhesives. More specifically, solvent-borne adhesives have become disfavored due to heightened environmental regulation. Hot melt adhesives are typically energy intensive and tend to possess relatively low heat resistance properties. Moreover, the performance characteristics of the solvent-borne and hot melt adhesives are often limited by the low molecular weight of the polymers employed.

Nonetheless, the end properties of water-borne adhesives are often adversely affected due primarily to the high water level of the adhesive polymer latexes. Specific disadvantages relate to grain raising on wood products, curling of paper products, and overall slow setting speed of the adhesive. Accordingly, recent efforts have focused on producing water-borne adhesives having increased solids content. This has been done in an attempt to enhance parameters relating to speed of adhesive set, water resistance, and adhesion to difficult-to-bond substrates. U.S. Pat. No. 5,434,216 to Mudge proposes vinyl acetate-based polymer emulsion formed of various monomers and having a solids content which may range between 40 and 50 weight percent.

U.S. Pat. No. 4,921,898 to Lenney et al. proposes a vinyl acetate-ethylene copolymer emulsion having a solids content between 65 and 70 weight percent and utilizing 2 to 4 weight percent of polyvinyl alcohol.

U.S. Pat. No. 5,070,134 to Oyamada et al. proposes a vinyl acetate ethylene copolymer emulsion having a solids content between 65 and 75 weight percent. Oyamada et al. employs a nonionic surface active agent having an HLB of from 16.5 to 17.5 per 100 parts by weight of the vinyl acetate unit.

In spite of any potential advantages, the above disclosed emulsions are disadvantageous from the standpoint of processing time, in that it often takes at least four hours to form the polymerized emulsions from the starting materials. Accordingly, it would be desirable to obtain a copolymer emulsion having a high solids content and a lower viscosity which exhibits adequate end properties and may be polymerized in a reduced time period.

SUMMARY OF THE INVENTION

It is therefore an object of the present invention to provide a vinyl acetate-ethylene copolymer emulsion which has a high solids content and low viscosity.

It is a further object of the present invention to provide a vinyl acetate-ethylene copolymer emulsion that may be polymerized in a reduced time.

To these ends and others, the present invention provides a vinyl acetate-ethylene copolymer emulsion having a solids content of at least about 65 percent by weight. The copolymer emulsion comprises about 5 to 40 percent by weight of ethylene; about 60 to 95 percent by weight of vinyl acetate; about 0.8 to 2.0 percent by weight of a fully or partially hydrolyzed polyvinyl alcohol having a degree of polymerization of from about 100 to 500; and a mixture of nonionic surfactants. The mixture of nonionic surfactants comprises about 0.5 to 1.9 percent by weight of an ethoxylated alkyl phenol having less than about 20 ethylene oxide units and about 0.1 to 0.5 percent by weight of an ethoxylated alkyl phenol having greater than about 50 ethylene oxide units. The mixture has an HLB of from about 16.0 to about 16.5.

In a preferred embodiment, the ethoxylated alkyl phenol having less than about 20 ethylene oxide groups is of the formula:

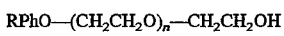

wherein R is an alkyl radical; Ph is phenyl; and n is an integer from 1 to 19. In another preferred embodiment, the ethoxylated alkyl phenol having greater than about 50 ethylene oxide units is of the above formula wherein R is an alkyl radical; Ph is phenyl; and n is an integer greater than 49.

The copolymer emulsion also preferably has a viscosity of less than about 4000 cps.

DETAILED DESCRIPTION OF THE PREFERRED EMBODIMENT

The present invention will now be described more fully hereinafter. This invention may, however, be embodied in many different forms and should not be construed as limited to the embodiment set forth herein; rather, this embodiment is provided so that this disclosure will be thorough and complete, and will fully convey the scope of the invention to those skilled in the art.

As summarized above, the present invention relates to a vinyl acetate-ethylene copolymer emulsion which has a solids content of at least about 65 percent. The copolymer emulsion is formed from about 5 to 40 percent by weight of ethylene; about 60 to 95 percent by weight of vinyl acetate; and about 0.8 to 2.0 percent by weight of a fully or partially hydrolyzed polyvinyl alcohol having a degree of polymerization of from about 100 to 500. The copolymer emulsion also includes a mixture of nonionic surfactants comprising about 0.5 to 1.9 percent by weight of ethoxylated alkyl phenol nonionic surfactant having less that 20 ethylene oxide units and about 0.1 to 0.5 percent by weight of ethoxylated alkyl phenol having greater than about 50 ethylene oxide units. The mixture has an HLB of from about 16.0 to 16.5. In particular, the copolymer emulsion has a viscosity of less than about 4000 cps.

Any suitable ethylene and vinyl acetate monomers may be employed in forming the copolymer emulsion. In a preferred embodiment, the emulsion is formed from about 10 to 25 percent of ethylene and from about 75 to 90 weight percent of vinyl acetate.

In accordance with the present invention, the copolymer emulsion includes a fully or partially hydrolyzed polyvinyl alcohol. Preferably, a polyvinyl alcohol is used having a low molecular weight ranging of from about 150 to 300. A partially hydrolyzed polyvinyl alcohol is one which can be about 87 to 89 mole percent hydrolyzed. The partially or fully hydrolyzed polyvinyl alcohol is one which has a degree of polymerization ranging preferably from about 150 to 300. Suitable polyvinyl alcohols can be prepared by synthesis and saponification techniques well known to those skilled in the art. A commercially preferred polyvinyl alcohol is Elvanol™ 51-05 sold by E. I. DuPont de Nemours, Co., of Wilmington, Del. Preferably, the fully or partially hydrolyzed polyvinyl alcohol is used in an amount ranging from about 0.8 to 2.0 percent based on the weight of monomers.

More preferably, the polyvinyl alcohol is used in an amount ranging from about 1.5 to 1.8 percent by weight.

A mixture of nonionic surfactants is employed in the copolymer emulsion of the present invention. Specifically, the mixture is made up of an ethoxylated alkyl phenol having less than about 20 ethylene oxide units and an ethoxylated alkyl phenol having greater than about 50 ethylene oxide units.

The ethoxylated alkyl phenol having less than about 20 ethylene oxide units may be chosen from all known and suitable compounds. Preferably, one of the appropriate Igepal™ surfactants sold by Rhone-Poulenc is employed. The Igepal™ surfactants are members of a series of alkylphenoxy poly(etylenoxy)ethanols which can be represented by the general formula

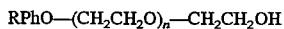

wherein R is an alkyl radical; Ph is phenyl; and n is an integer from 1 to 19. Exemplary compounds of this type have alkyl groups containing from about 7–18 carbon atoms, such as the octylphenoxy poly(ethyleneoxy)ethanols, nonylphenoxy poly(ethyleneoxy)ethanols, and dodecylphenoxy poly(ethyleneoxy)ethanols.

The ethoxylated alkyl phenol having greater than about 50 ethylene oxide units may be selected from any of the known and suitable compounds of this type. Preferred compounds are of the Igepal surfactants having the general formula:

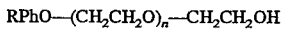

wherein R is an alkyl radical; Ph is phenyl; and n is an integer greater than 49.

The amounts of the nonionic surfactants present in the mixture are selected such that the mixture has a hydrophilic/lipophilic balance (HLB) of from about 16.0 to 16.5. Specifically, emulsion includes from about 0.5 to 1.9 percent by weight of the ethoxylated alkyl phenol having less than about 20 ethylene oxide groups, and more preferably from about 1.0 to 1.5 percent by weight. The emulsion also includes from about 0.1 to 1.0 percent by weight of the ethoxylated alkyl phenol having more than about 50 ethylene oxide groups, and more preferably from about 0.2 to 0.5 percent by weight.

The vinyl acetate-ethylene copolymers of the present invention may optionally include one or more additional monomers such as, but not limited to, aliphatic conjugated dienes, non-aromatic unsaturated mono- or dicarboxylic ester monomers, aromatic unsaturated monomers, and nitrile monomers.

Suitable aliphatic conjugated dienes are $C_4$ to $C_9$ dienes and include, for example, butadiene monomers such as 1,3-butadiene, 2-methyl-1,3-butadiene, 2 chloro-1,3-butadiene, and the like. Blends or copolymers of the diene monomers can also be used. The aliphatic conjugated diene may be used in an amount, based on total weight of the starting monomers, from about 0 to 5 percent by weight.

Suitable non-aromatic unsaturated monocarboxylic ester monomers include acrylates and methacrylates. The acrylates and methacrylates may include functional groups such as amino groups, hydroxy groups, epoxy groups and the like. Exemplary acrylates and methacrylates include methyl acrylate, methyl methacrylate, ethyl acrylate, ethyl methacrylate, butyl acrylate, butyl methacrylate, 2-ethylhexyl acrylate, glycidyl acrylate, glycidyl methacrylate, hydroxyethyl acrylate, hydroxyethyl methacrylate, hydroxypropyl acrylate, hydroxypropyl methacrylate, isobutyl methacrylate, hydroxybutyl acrylate, hydroxybutyl methacrylate, 3-chloro-2-hydroxybutyl methacrylate, n-propyl methacrylate and the like. Exemplary amino-functional methacrylates include t-butylamino ethyl methacrylate and dimethylamino ethyl methacrylate. Suitable non-aromatic dicarboxylic ester monomers are alkyl and dialkyl fumarates, itaconates and maleates, with the alkyl group having one to eight carbons, with or without functional groups. Specific monomers include diethyl and dimethyl fumarates, itaconates and maleates. Other suitable non-aromatic dicarboxylic ester monomers include di(ethylene glycol) maleate, di(ethylene glycol) itaconate, bis(2-hydroxyethyl) maleate, 2-hydroxyethyl methyl fumarate, and the like. The non-aromatic unsaturated mono- or dicarboxylic ester monomer is used in an amount, based on total weight of the starting monomers, preferably from about 0 to 5 percent by weight.

Suitable monomers based on the half ester of the unsaturated dicarboxylic acid monomer include mono esters of maleic acid or fumaric acid having the formula ROOC—CH=CH—COOH wherein R is a $C_1$ to $C_{12}$ alkyl group, for example monomethyl maleate, monobutyl maleate and monooctyl maleate. Half esters of itaconic acid having $C_1$ to $C_{12}$ alkyl groups such as monomethyl itaconate can also be used. Blends or copolymers of the unsaturated mono- or dicarboxylic acid monomers and of the half ester of the unsaturated dicarboxylic acid can also be used. The unsaturated mono- or dicarboxylic acid or monomer based on the half ester of the unsaturated dicarboxylic acid is used in an amount, based on the total weight of the starting monomers, from about 0 to 5 percent by weight.

Suitable aromatic unsaturated monomers may be employed and include styrene and styrene derivatives such as alphamethylstyrene, p-methyl styrene, divinyl benzene, vinyltoluene, divinyl toluene, ethylstyrene, tert-butyl styrene, monochlorostyrene, dichlorostyrene, vinyl benzyl chloride, fluorostyrene, alkoxystyrenes (e.g., paramethoxystyrene) and the like. The aromatic unsaturated monomers may be employed in an amount, based on the total weight of the monomer, ranging from about 0 to 5 percent by weight.

Unsaturated mono- or dicarboxylic acid monomers and derivatives thereof may also be employed and include acrylic acid, methacrylic acid, itaconic acid, fumaric acid, and maleic acid. Such monomers may be used in an amount based on the total weight of the monomers ranging from about 0 to 5 percent by weight.

Unsaturated nitrogen-containing monomers may also be employed such as acrylonitrile, methacrylonitrile, acrylamide, methacrylamide, N-methylolacrylamide, alkylated N-methylolacrylamides such as N-methoxymethylacrylamide and N-butoxymethylacrylamide and acrolein. The nitrogen-containing monomers may be used in an amount, based on the total weight of the monomers, ranging from about 0 to 5 percent by weight.

The copolymer emulsion can include additives to improve its various physical and mechanical properties, the selection of which is readily apparent to one skilled in the art. For example, any appropriate crosslinking agent may be used, along with monomers which promote solvent resistance, adhesion and strength.

Initiators are often employed to facilitate polymerization and can include, for example, materials such as persulfates, peroxides, peresters, and azo compounds such as azobis (isobutyronitrile) (AIBN). Peroxide initiators are preferred and include, for example, cumene hydroperoxide, 2,5-dimethylhexane-2,5-dihydroperoxide, dicumylperoxide, diisopropylbenzene hydroperoxide, tert butyl hydroperoxide, and the like. For the purposes of the invention, hydrogen peroxide is a preferred initiator. Preferably, the amount of initiator ranges from about 0.01 percent to 2 percent based on the weight of the total monomer. More preferably, the initiator ranges from about 0.1 percent to 1 percent.

Reductants may be employed in the polymerization, and are typically employed in combination with the initiator as part of a redox system. Suitable reductants include sodium bisulfite, erythorbic acid, ascorbic acid, sodium thiosulfate, sodium formaldehyde sulfoxylate (SFS), and the like. A preferred redox system includes hydrogen peroxide as an initiator, SFS, and ferrous sulfate.

Other additives which may be used include other natural and synthetic binders, fixing agents, wetting agents, plasticizers (e.g., diisodecyl phthalate), softeners, foam-inhibiting agents, froth aids, other crosslinking agents (e.g., melamine formaldehyde resin), flame retardants, dispersing agents (e.g., tetrasodium pyrophosphate), pH adjusting components (e.g., acetic acid), sequestering or chelating agents (e.g., ethylene diaminetetraacetic acid (EDTA) and other components. The selection of any of these additives is readily apparent to one skilled in the art.

The emulsion polymerization of the invention may be carried out by any well known and suitable means, including batch and semi-continuous techniques. In general, the process of forming the vinyl acetate-ethylene copolymer emulsion includes initially charging a reaction vessel with vinyl acetate, water, surfactant, and polyvinyl alcohol, along with any other suitable components, The vessel is also typically pressurized with ethylene. The vessel is preferably heated and maintained to a temperature ranging from about 120° F. to 180° F., with the ethylene pressure being at about 300 to 800 psi. Preferably, the vessel is initially charged with at least about 10 percent of the total vinyl acetate, with the remainder being added at increments during the course of the polymerization. It should be emphasized that such incremental additions can be continuous or discontinuous with respect to quantity and time.

At the start of the polymerization, the reaction vessel may be agitated by any suitable means so as to dissolve the ethylene in the vinyl acetate and water. The pressurized ethylene source can be shut off from the reactor so that the ethylene pressure decays as the polymerization is carried out or the source can be kept open to maintain the ethylene pressure throughout the reaction.

The polymerization is typically initiated by introducing initial quantities of initiator, with the reductant typically being added with the initial charge. After the polymerization has begun, additional initiator and reductant may be added as required to continue the polymerization reaction. The reaction is generally continued until the residual vinyl acetate content is below about 0.5%. Advantageously, the time for the polymerization reaction to be carried out ranges from about 1 to 3 hours, and more preferably less than about 2 hours. As known in the art, the reaction time will vary depending upon variables such as temperature, the types of monomers utilized, and the desired extent of polymerization.

The emulsion produced by the present invention possesses desirable end properties. The emulsion has a solids content of greater than about 65 weight percent, and more preferably between about 65 and 72 weight percent. The emulsion has a viscosity lower than about 4000 cps determined in accordance with known and appropriate procedure.

The emulsion of the present invention may be advantageously used in a number of adhesive compositions. The emulsion is particularly desirable in adhesives which are used in making laminates, and in adhesives which are used to bind polymeric materials (e.g., vinyl) to cellulosic substrates. In such applications, the adhesives display good stability under variable humidity conditions.

The present invention and its advantages over the prior art will be more fully understood and appreciated from the illustrative examples which follow. It is understood that the examples are for illustrative purposes only, and are not intended as being limited upon the scope of the invention. A person skilled in the applicable arts will appreciate from these examples that this invention can be embodied in many different forms other than is specifically disclosed.

EXAMPLE 1

Various emulsions of the present invention were produced as described below. In general, 28.5 g of Elvanol™ 51-05 (polyvinyl alcohol); 19 g of Igepal™ CO-850, and 13.57 g of Igepal™ CO-977 (surfactants); 1.58 g of 100% of acetic acid (pH adjusting component); along with 4.7 g of sodium formaldehyde sulfoxylate (reductant) present in 665 g of water, were placed in a 1 gallon reactor. The solution was purged with nitrogen. The agitator speed was set to 215 rpm. Next, a solution of 0.02 g of ferrous sulfate in 19 g of water and 950 g of vinyl acetate (50 percent of the total amount to be employed) were added to the reactor. When the temperature reached 140° F., the ethylene pressure was gradually increased until it reached 450 psi. The agitation was set to 900 rpm, and the ethylene pressure controls were set to 651 psi.

When the ethylene pressure reached 651 psi, 316 ml of 0.42 percent solution of hydrogen peroxide (initiator) was added over 60 min. 10 minutes after starting delay of the initiator, another 50 percent (950 g) of vinyl acetate monomer was added over 45 minutes. After all delays were done, the ethylene pressure was reduced to 175 psi and 4.3 ml of 4.4 percent solution of hydrogen peroxide was added over 5 minutes.

Tables 1 and 2 illustrate the conditions and resulting properties for trials A, B, and C. As shown, the water amounts in the polymerizations were manipulated so as to slightly vary.

TABLE 1

| SAMPLE | A | B | C |
|---|---|---|---|
| Water | 35 | 32 | 33 |
| Elvanol 51-05 | 1.5 | 1.5 pts | 1.5 pts |
| Surfactant | CP-850 | CO-850 | CO-850 |
|  | 1.0 pts | 1.0 pts | 1.0 pts |
|  | CO-977 | CO-977 | CO-977 |
|  | 0.5 pts | 0.5 pts | 0.5 pts |
| Polymerization temp, °F. | 140 | 140 | 140 |
| Polymerization time, min. | 60 | 60 | 60 |

TABLE 2

| SAMPLE | A | B | C | C* |
|---|---|---|---|---|
| Solids, % | 67.0 | 67.9 | 67.8 | 66.3 |
| Ethylene, % | 19 | 21 | 18 | 18 |
| Viscosity, 20 rpm | 2055 | 3700 | 5980 | 1350 |
| G/H Viscosity | R-S | R-S | N-O | N-O |
| 10% Plast. Resp. | 6.2 | 5.2 | 3.9 | 3.6 |
| Water Spot Rub, sec. | 48 | 102 | 219 | 130 |
| Rate of Set, sec. | 13 | 14 | 13 | 10 |

TABLE 2-continued

| SAMPLE | A | B | C | C* |
|---|---|---|---|---|
| Peel Adhesion (pli), 2"/min (12"/min) | | | | |
| Webbing/canvas | 3.4 (3.5) | 3.8 (3.9) | 3.4 (3.4) | 5.3 (6.1) |
| PVC/Particleboard | 3.7 (5.0) | 3.6 (4.8) | 4.1 (5.5) | 4.5 (6.0) |
| Film on Glass | | | clear | |

C* is C diluted by water to reduce viscosity.

As can be shown, the resulting emulsion samples exhibited a high solids content and low viscosity. Moreover, the emulsions were produced at in a reduced time relative to prior art emulsions. Advantageously, increased emulsion production may be achieved as a result of reduced polymerization time.

The emulsion samples also demonstrated good peel adhesion values. The peel adhesion values were determined in accordance with the following Reichhold testing procedure. Specifically, several sheets of 8½"×11" paper were placed on a coating board. Two 1"×15" vinyl strips were placed on a coater. In general, if the vinyl is textured, the smooth side of the strip should be coated. The vinyl strips were placed so that at least 6" of each strip was coated. The vinyl strips were coated using a #32 wire wound coating rod. The vinyl strips were applied to the particleboard immediately to form a lamination. A 6 lb. steel roller was passed over the lamination once. A glass plate was placed over the lamination, and the laminate was allowed to set for at least one hour. The laminate was conditioned overnight. Subsequently, the peel adhesion values were determined using an Instron testing apparatus with a 1,000 lb load cell set on 20 lbs. Approximately 2" of the laminate was pulled at a rate of 2"/min. crosshead speed and 1"/min. chart speed. The remainder of the laminate was pulled at a rate of 12"/min. crosshead speed and 2"/min. chart speed. The test was repeated so as to obtain 4 vinyl strips for each emulsion sample. The three closest peel adhesion values were averaged and reported as pounds bond strength at 2"/min. and 12"/min.

EXAMPLE 2

A comparison of emulsions disclosed in U.S. Pat. Nos. 4,921,898 to Lenney et al. ("Lenney '898") and 5,070,134 to Oyamada et al. ("Oyamada '134") was conducted relative to a copolymer emulsion of the present invention. All of the samples were made from 100 parts of vinyl acetate, ethylene pressure at 550 psi, 0.001 part of ferrous sulfate, 0.07 part of acetic acid, 0.245 part of sodium formaldehyde sulfoxylate, and 40–41 parts of water. In all instances, the polymerization occurred at 140° F. over 130 minutes.

Different types of polyvinyl alcohols and/or surfactants accounted for the differences between the emulsions. Specifically, the Lenney '898 emulsion included 3 parts (i.e., weight percent based on vinyl acetate) of ultra low molecular weight partially hydrolyzed polyvinyl alcohol Airvol™ 203 (formerly named Vinol™ 203) along with 2 parts of nonionic ethoxylated nonyl phenol surfactant Igepal CO-887™ (30 ethylene oxide units, HLB 17.2).

The Oyamada '134 emulsion included 1.2 parts of low molecular weight partially hydrolyzed polyvinyl alcohol Airvol™ 205 and 2 parts of Igepal CO-887™.

The emulsion of the present invention included a mixture of a low molecular weight partially hydrolyzed polyvinyl alcohol Airvol™ 205 (1.3 parts) with an ultra low molecular weight fully hydrolyzed alcohol Airvol™ 103 (0.5 part). Also included was a mixture of nonionic ethoxylated nonyl phenol surfactants, namely 1.2 parts of Igepal™ CO-850 (20 ethylene oxide units, HLB 16.0) with 0.5 parts of Igepal™ CO-977 (50 ethylene oxide units, HLB 18.2).

The results of the trials are presented in Table 3.

TABLE 3

| Sample | % Solids | pH | Viscosity, cps | Water Spot Rub, sec. | Rate of Set, sec. | Vinyl to Particleboard @ R.T. 12"/min(pli) |
|---|---|---|---|---|---|---|
| invention | 65.4 | 4.3 | 1720 | 4 | 14 | 7.3 |
| Oyamada '134 | 65.4 | 4.6 | 3220 | 6 | 10 | 7.8 |
| Lenney '898 | 65.4 | 4.5 | 3320 | 5 | 13 | 8.3 |

As can be seen, the emulsions exhibited similar desired properties with the exception of viscosity. Advantageously, the viscosity of the emulsion of the present invention is lower in comparison to the other prior art emulsions. This is beneficial in that the emulsion may be more easily processed in subsequent operations.

That which is claimed:

1. A vinyl acetate-ethylene copolymer emulsion having a solids content of at least about 65 percent by weight, said copolymer comprising:

about 5 to 40 percent by weight ethylene;

about 60 to 95 percent by weight vinyl acetate;

about 0.8 to 2.0 percent by weight of a fully or partially hydrolyzed polyvinyl alcohol having a degree of polymerization of from about 100 to 500; and a mixture of nonionic surfactants comprising about 0.5 to 1.9 percent by weight of an ethyoxylated alkyl phenol having less than about 20 ethylene oxide units and about 0.1 to 0.5 percent by weight of an ethoxylated alkyl phenol having greater than about 50 ethylene oxide units, the mixture having a HLB of from about 16.0 to 16.5.

2. The copolymer emulsion according to claim 1 wherein the ethyoxylated alkyl phenol having less than about 20 ethylene oxide units is of the formula:

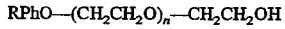

RPhO—$(CH_2CH_2O)_n$—$CH_2CH_2OH$ wherein R is an alkyl radical; Ph is phenyl; and n is an integer from 1 to 19.

3. The copolymer emulsion according to claim 1 wherein the ethyoxylated alkyl phenol having greater than about 50 ethylene oxide units is of the formula:

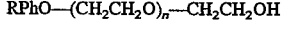

RPhO—$(CH_2CH_2O)_n$—$CH_2CH_2OH$ wherein R is an alkyl radical; Ph is phenyl; and n is an integer greater than 49.

4. The copolymer emulsion according to claim 1 wherein said copolymer emulsion has a solids content ranging of from about 65 to 72 percent by weight.

5. A vinyl acetate-ethylene copolymer emulsion having a solids content of at least about 65 percent by weight, said copolymer comprising:
   about 5 to 40 percent by weight ethylene;
   about 75 to 90 percent by weight vinyl acetate;
   about 0.8 to 2.0 percent by weight of a fully or partially hydrolyzed polyvinyl alcohol having a degree of polymerization of from about 100 to 500; and
   a mixture of nonionic surfactants comprising about 0.5 to 1.9 percent by weight of an ethyoxylated alkyl phenol having less than about 20 ethylene oxide units and about 0.1 to 0.5 percent by weight of an ethoxylated alkyl phenol having greater than about 50 ethylene oxide units, the mixture having a HLB of from about 16.0 to 16.5;
   wherein said copolymer emulsion has a viscosity of less than about 4000 cps.

6. The copolymer emulsion according to claim 6 wherein the ethyoxylated alkyl phenol having less than about 20 ethylene oxide units is of the formula:

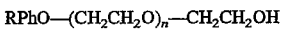
$$RPhO-(CH_2CH_2O)_n-CH_2CH_2OH$$

wherein R is an alkyl radical; Ph is phenyl; and n is an integer from 1 to 19.

7. The copolymer emulsion according to claim 5 wherein the ethyoxylated alkyl phenol having greater than about 50 ethylene oxide units is of the formula:

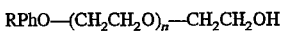
$$RPhO-(CH_2CH_2O)_n-CH_2CH_2OH$$

wherein R is an alkyl radical; Ph is phenyl; and n is an integer greater than 49.

8. The copolymer emulsion according to claim 5 wherein said copolymer emulsion has a solids content ranging of from about 65 to 72 percent by weight.

* * * * *